United States Patent [19]
Schulz-Lekies

[11] Patent Number: 5,367,352
[45] Date of Patent: Nov. 22, 1994

[54] DIRECTION-CHANGING ROLLER FOR SUSPENSION FRAMES OF PHOTOGRAPHIC MATERIAL DEVELOPING MACHINES

[75] Inventor: Detlef Schulz-Lekies, Ratingen, Germany

[73] Assignee: Hostert GmbH, Germany

[21] Appl. No.: 954,567

[22] Filed: Sep. 30, 1992

[30] Foreign Application Priority Data

Oct. 2, 1991 [DE] Germany .................. 9112272[U]

[51] Int. Cl.⁵ .................................................. G03D 3/08
[52] U.S. Cl. .................... 354/321; 354/339; 193/35 MD
[58] Field of Search .......................... 354/318–324, 354/339; 226/183–186, 189, 190, 192; 198/780, 784; 193/35 MD, 37; 271/21, 22, 120, 225, 250, 184–186, 9, 10; 492/16, 20, 38

[56] References Cited
U.S. PATENT DOCUMENTS 1,123,851  1/1915  Cooper .......................... 193/35 MD
3,590,970  7/1971  Kornylak ............................ 193/37
3,917,258 11/1975  Miller ............................ 271/120 X

FOREIGN PATENT DOCUMENTS 1061694  7/1959  Germany ................... 193/35 MD
62-264111 11/1987  Japan ....................... 193/35 MD Primary Examiner—D. Rutledge
Attorney, Agent, or Firm—Webb Ziesenheim Bruening Logsdon Orkin & Hanson

[57] ABSTRACT

There is disclosed a direction-changing roller for suspension frames of photographic material developing machines, over which the photographic material to be developed is guided in a meandering path. The roller has a cylindrical roller body on each end of which there is arranged a respective collar-shaped flange. There are further rollers inserted in the roller body. The surfaces of the further rollers are flush with the outline or surface of the roller body. Each further roller is mounted to be freely rotatable about an axis extending perpendicular to the axis of rotation of the direction-changing roller and radially offset from this axis of rotation.

6 Claims, 1 Drawing Sheet 3,367,352

DIRECTION-CHANGING ROLLER FOR SUSPENSION FRAMES OF PHOTOGRAPHIC MATERIAL DEVELOPING MACHINES

BACKGROUND OF THE INVENTION

1. Field of the Invention

The invention relates to a direction-changing roller for suspension frames of developing machines for films or photographic paper, in which the strip-like material which is to be developed is guided along a zigzag or meandering path over the suspension frame and the rollers mounted in it. This direction-changing roller comprises a cylindrical roller body on each end of which there is arranged a collar-like flange which has the effect of preventing the strip-like material which is mounted on and runs on the roller from slipping off the adjacent end of the roller.

2. Background of the Information

When two or more lengths of strip-like photographic material are mounted and guided in a zigzag path over a section of a continuous developing machine formed as a suspension frame, the use of mutually coaxially arranged transporting, running or direction-changing rollers results in an inclined path of the strip-like photographic material, which is conducted around the individual rollers over about 180°. This means that the strip-like film material, between its first point of contact with a roller and its last point of contact, i.e. from entry to departure from this roller, is displaced in the direction of the axis of the roller. The extent of the relative movement between the strip-like shape photographic material and the surface of the associated direction-changing roller is dependent on the geometry of the suspension frame, i.e. on the spacing between the spindles of the two axes of the suspension frame the widths of the individual rollers and so on.

In order to compensate for the axial displacement of the strip-shaped photographic material it is known to arrange the rollers arranged at the lower end of the frame in an inclined direction, i.e. to mount them to rotate about axes which are arranged inclined to the vertical plane of the suspension frame and at the same time parallel to one another. Such an arrangement of the lower rollers however not only is complicated and therefore expensive, but can only partially solve the problem of the axial displacement of the strip-shaped photographic material because non-uniformity in the tension of the web and in the transport of the photographic material cannot be compensated easily.

SUMMARY OF THE INVENTION

The invention is based on solving the problem, in a suspension frame for photographic material developing machines, of constructing the direction-changing rollers for the strip-shaped photographic material in such a way that they permit lateral movement of the strip-shaped photographic material guided by and running over them to match the current operating conditions without, for this purpose, having to be mounted inclined.

According to the present invention, in a direction-changing roller of the kind stated in the introduction, the roller body is provided with additional rollers, each having a surface flush with the surface of the roller body, and each being rotatably mounted about an axis perpendicular to the axis of rotation of the direction-changing roller, and radially offset from said axis of rotation.

The additional rollers provided in the surface region or peripheral region of the direction-changing roller are rigidly fixed in the radial running direction but allow the photographic material which is running over this roller to move transverse to the direction of travel. In this way the strip-shaped photographic material which is running over the associated direction-changing roller and carried around the suspension frame in a zigzag path can also be displaced axially at the points of change in direction in accordance with the prevailing operating conditions, without the direction-changing rollers having to be mounted in inclined directions, so that not only is a simple mounting of the direction-changing rollers possible but also automatic individual matching of the guiding of the photographic material to the prevailing operating conditions is possible.

BRIEF DESCRIPTION OF THE DRAWINGS

An embodiment by way of example of a direction-changing roller according to the invention is illustrated in the drawings in which.

DESCRIPTION OF THE PREFERRED EMBODIMENT

Figure 1:
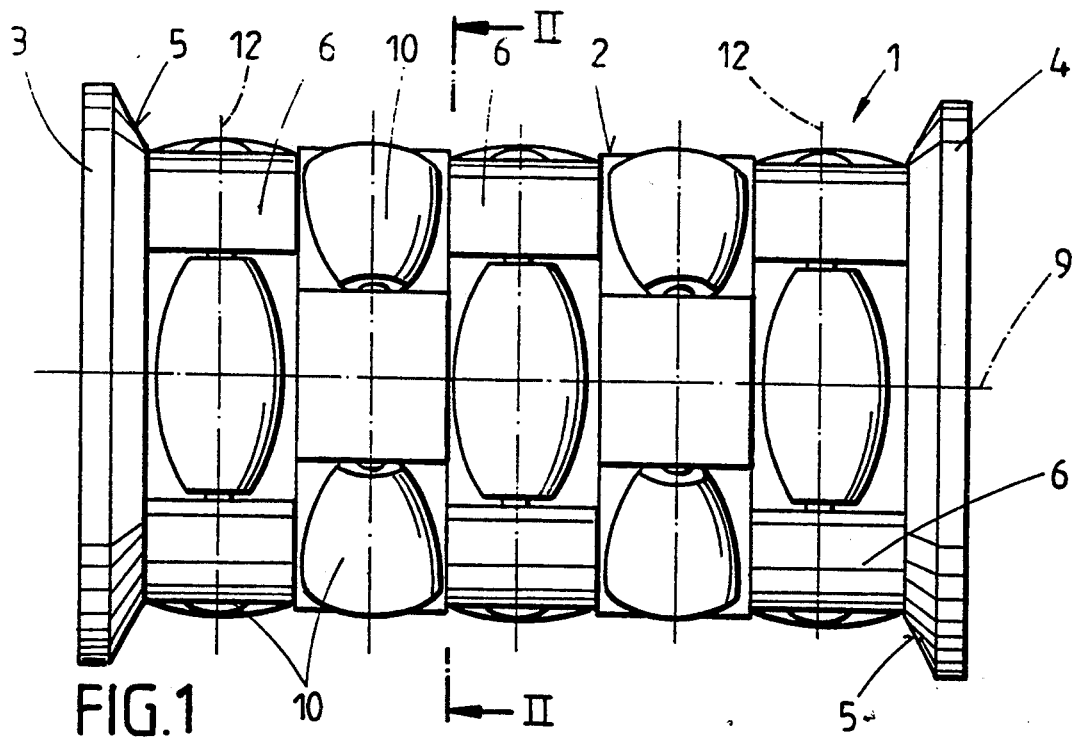
FIG. 1 is a side view of the roller, of which the roller body comprises a number of mutually coaxially arranged discs, in each of which are inserted additional rollers mutually offset through half their spacing.
Figure 2:
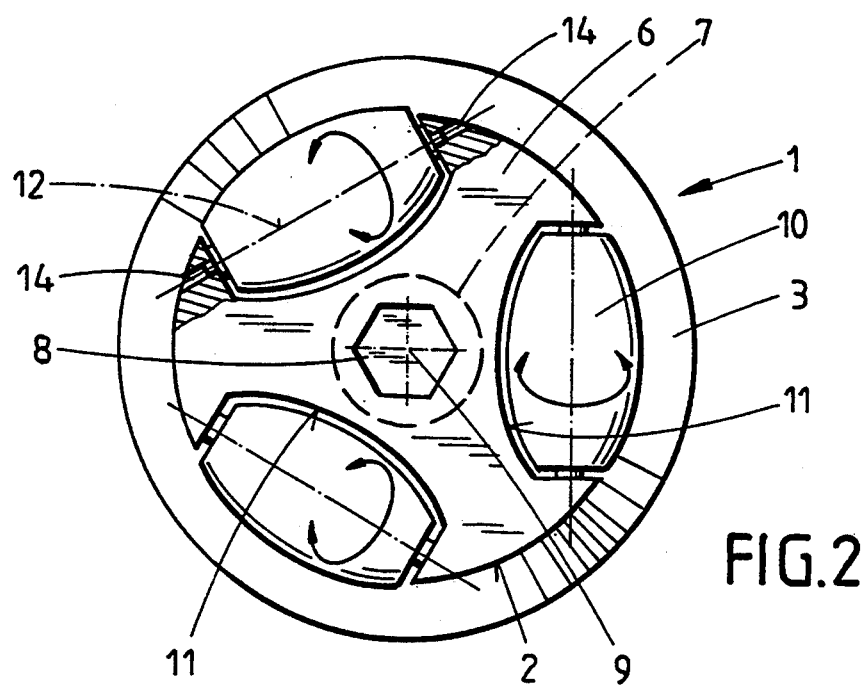
FIG. 2 is a cross-section through the roller on the line 2—2 in FIG. 1

The direction-changing roller 1 in FIG. 1 and 2 for a suspension frame, not shown, of a photographic material developing machine comprises a cylindrical roller body 2 which is provided on each of its two ends with a respective collar-shaped flange 3 and 4. Each collar-shaped flange 3 and 4 has a chamfer or inclination with respect to the cylindrical body 2 of the roller.

The cylindrical body 2 of the roller, as shown in FIG. 1, is made up of a number of individual discs 6 which are circular or cylindrical in plan, as shown in FIG. 1 and 2. These discs 6—according to FIG. 1 the roller 1 has five such discs altogether—are arranged on a common hub 7 and secured together against relative rotation. This hub contains a central opening which in this example is hexagonal and which matches a correspondingly shaped spindle, not shown, of the suspension frame of the developing machine, so that the direction-changing roller is rotatable about its central axis 9 in this suspension frame or section of the developing machine.

As shown in particular in FIG. 2, there are inserted in each disc 6 three domed or barrelled rollers 10, each mounted to rotate in a matching recess 11 about a spindle 12. The spindles 12 of the individual rollers are arranged at right angles and so to speak tangential to the central axis of the direction-changing roller 1.

As shown in particular in FIG. 2 each spindle 12 has at each end a trunnion 13 engaging in a corresponding bore 14 within the associated disc 6, this bore 14 forming the bearing for the trunnion 13.

It can be seen from FIG. 1 that the adjacent discs 6 of the direction-changing roller are angularly offset with respect to one another so that the individual rollers 10 mounted in them are each offset from adjacent individual rollers 10 of an adjacent disc 6 through an amount equal to half the spacing of the individual rollers 10 of the disc 6, as shown in FIG. 1.

Figure 3:
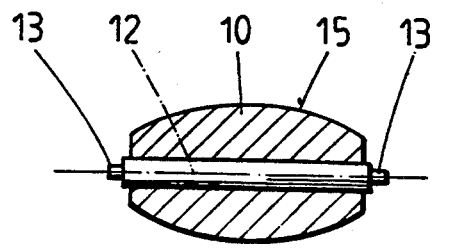
FIG. 3 is a longitudinal section through one of the additional rollers inserted in the roller body of the direction-changing roller according to FIG. 1 and 2.

As shown in particular in FIG. 3, the individual rollers 10 have a convex surface 15. This convex surface 15 forming the outline of the roller 10 in question corresponds in its curvature to the surface of the associated disc 6, as shown in particular in FIG. 2. Accordingly the strip-shaped photographic material, which is not shown in the drawing, guided and running over the direction-changing roller, lies with point contact or line contact on the individual rollers 10 and possibly the associated disc 6.

The rollers 10 permit axial movement of the strip-shaped photographic material in accordance with the prevailing operating conditions without the photographic material having to be displaced relative to its support.

The direction-changing roller 1 is suitable for developing machines for developing photographic material of all kinds, i.e. both for continuously advancing films and also for strips of photographic paper. It is particularly suitable for a transport system designed for wide strip-shaped material for development.

What is claimed is:

1. A direction-changing roller for suspension frames of photographic material developing machines, said photographic material to be developed being in strip form and guided by and running over said direction-changing roller in a meandering path, said roller having an axis of rotation and comprising a roller body with a cylindrical surface and two axial ends, there being sockets in said cylindrical surface, means comprising a collar-shaped flange being arranged on each said axial end of said body having a diameter greater than the diameter of the roller body for preventing the material in strip form from slipping off the axial ends of the direction-changing roller, said roller body being provided with barrel-shaped rollers positioned in said sockets, each said barrel-shaped roller having a surface substantially flush with said surface of said roller body such that a strip of photographic material running over the direction-changing roller may make contact with the barrel-shaped roller and sliding contact with the cylindrical surface between the sockets and each said barrel-shaped roller being freely rotatably mounted about an axis, said axis extending perpendicular to said axis of rotation of said direction-changing roller and being radially offset from said axis of rotation.

2. A direction-changing roller as claimed in claim 1, wherein said barrel-shaped rollers are provided in several parallel radial planes of said direction-changing roller.

3. A direction-changing roller as claimed in claim 1, wherein said barrel-shaped rollers are arranged mutually offset by 120° in a radial plane of said direction-changing roller.

4. A direction-changing roller as claimed in claim 1, wherein each said surface of each said barrel-shaped roller is a convex surface.

5. A direction-changing roller as claimed in claim 1, wherein said body of said direction-changing roller comprises a plurality of discs having a cylindrical surface with sockets therein in which said barrel-shaped rollers are journaled, said discs being coaxial and secured together against relative rotation.

6. A direction-changing roller as claimed in claim 5, wherein said barrel-shaped rollers in adjacent discs are offset from the barrel-shaped rollers of an adjacent disc by one-half the spacing of the barrel-shaped rollers of the adjacent disc.

* * * * *